Nov. 23, 1954
N. DEKOLD
2,695,352
HOT TABLE
Filed Oct. 22, 1952
3 Sheets-Sheet 1
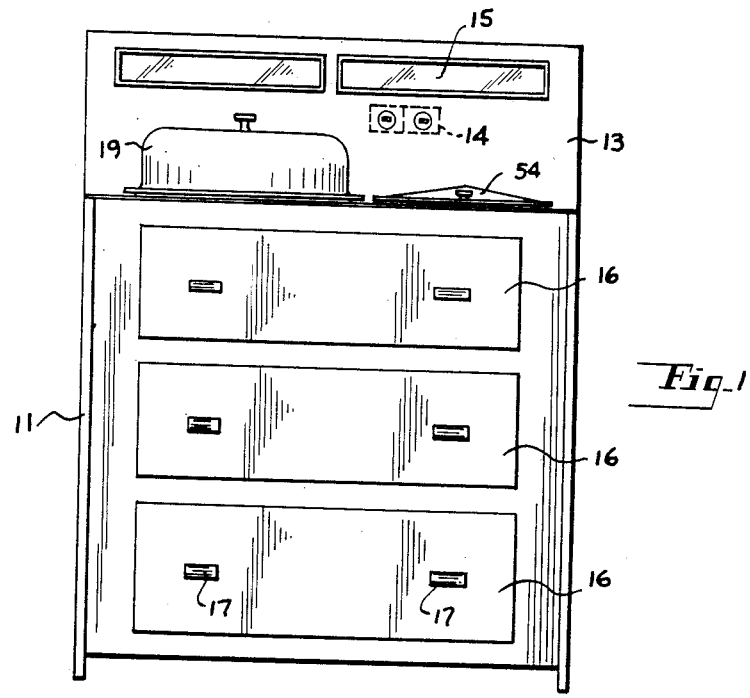
Fig. 1
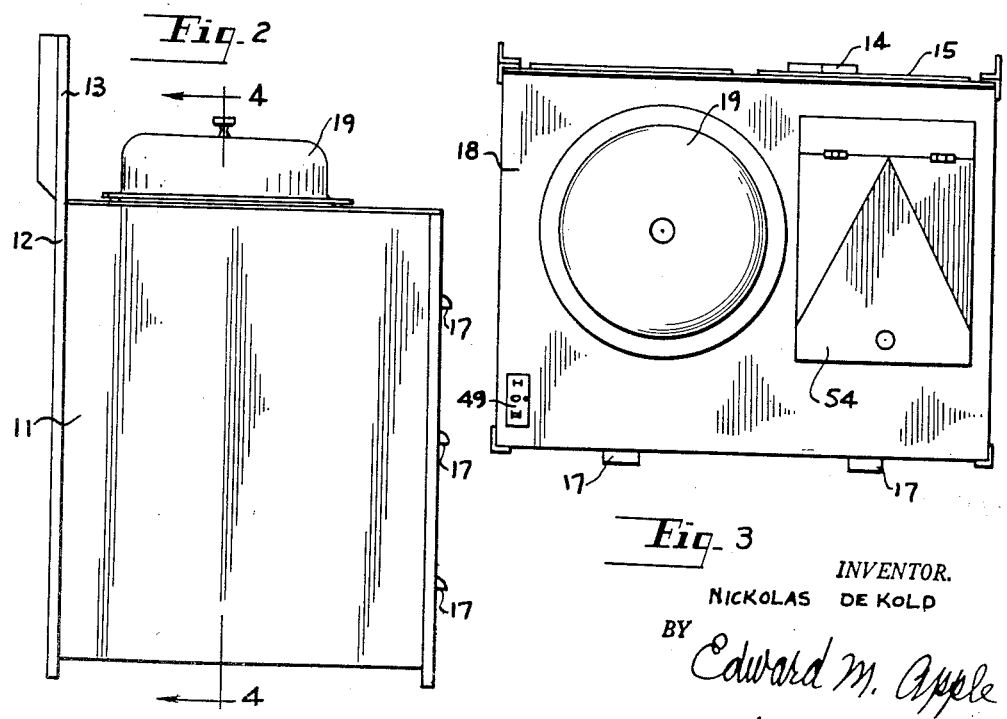
Fig. 2
Fig. 3
INVENTOR.
NICKOLAS DE KOLD
BY Edward M. Apple
ATTORNEY.

Nov. 23, 1954  N. DEKOLD  2,695,352
HOT TABLE
Filed Oct. 22, 1952  3 Sheets-Sheet 2

INVENTOR.
NICKOLAS DEKOLD.
BY
Edward M. Apple
ATTORNEY.

Nov. 23, 1954 N. DEKOLD 2,695,352
HOT TABLE
Filed Oct. 22, 1952 3 Sheets-Sheet 3
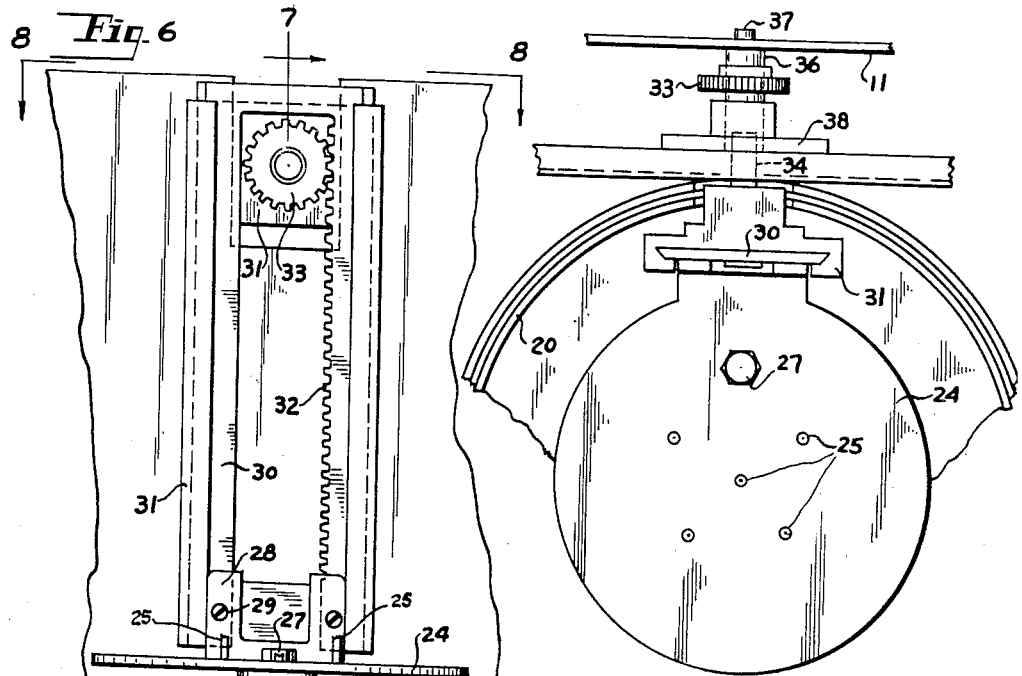
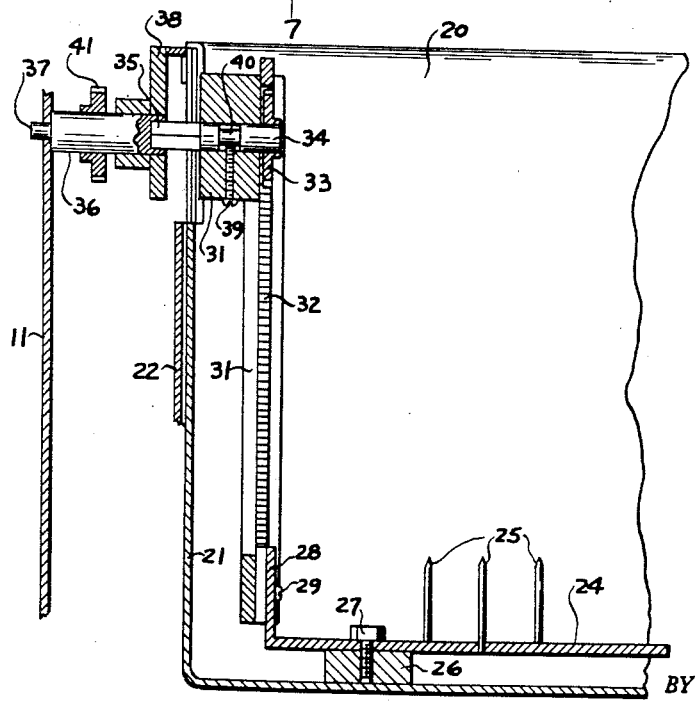
INVENTOR.
NICKOLAS DEKOLD.
BY Edward M. Apple
ATTORNEY.

United States Patent Office 2,695,352
Patented Nov. 23, 1954

2,695,352

HOT TABLE

Nickolas Dekold, Dearborn, Mich.

Application October 22, 1952, Serial No. 316,207

1 Claim. (Cl. 219—19)

This invention relates to restaurant equipment, and has particular reference to a device for handling food in the making of sandwiches.

An object of the invention is to provide an electric hot table whereby the user may prepare a ham and then store it in a heated receptacle, from which it is readily accessible at all times.

Another object of the invention is to provide a heating receptacle for a ham or the like, with means for elevating the ham from the receptacle and firmly supporting the ham, so that slices may readily be taken therefrom, and means for returning it to storage.

Another object of the invention is to generally improve devices of the character indicated and to provide an all electric hot table for heating and storing the ingredients for the making of sandwiches, which device is simple in construction, economical to manufacture, and efficient in use.

The foregoing and other objects and advantages of the invention will become more apparent as the description proceeds, reference being made from time to time to the accompanying drawing forming part of the within disclosure, in which drawing:

Fig. 1 is a front elevational view of a device embodying the invention.

Fig. 2 is a side elevational view thereof.

Fig. 3 is a top plan view thereof.

Fig. 6 is an enlarged fragmentary detail, in elevation, illustrating part of the elevating and lowering mechanism.

Fig. 7 is a section taken substantially on the line 7—7 of Fig. 6.

Fig. 8 is a plan view taken on the line 8—8 of Fig. 6.

Figure 4:
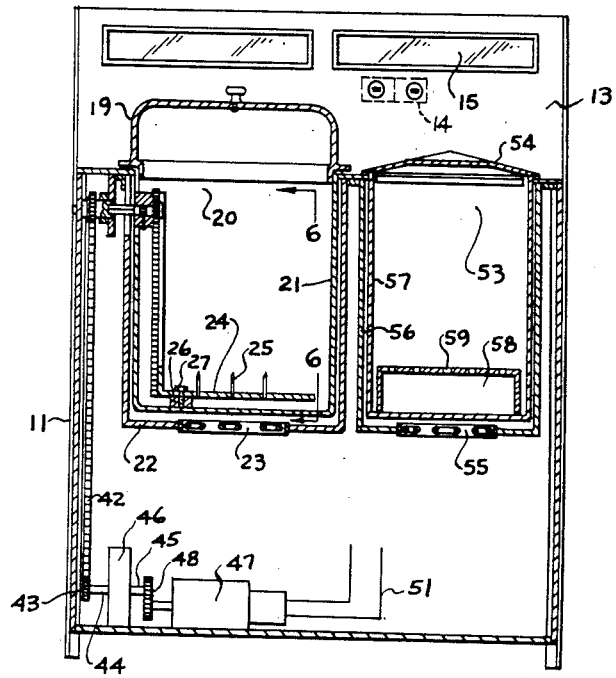
Fig. 4 is a section taken substantially on the line 4—4 of Fig. 2.

Referring now more particularly to the drawing, it will be understood that in the embodiment herein disclosed, the reference character 11 indicates the cabinet in which the working parts of the device are housed. The cabinet 11 is provided with a back panel 12, which extends, as at 13, above the cabinet proper and serves as a means for supporting the electric outlet 14 and the decorative elements 15. The cabinet 11 is preferably made of stainless steel and may be assembled and held together by any suitable means.

The cabinet 11 is provided with a plurality of drawers 16, for the storage of pans or other utensils. Each drawer 16 is provided with hand grips 17, all of which elements are conventional and form no part of the invention, except as they are combined with the elements hereinafter described.

The top panel 18 of the cabinet is provided with a circular opening, which is arranged to be covered by means of a removable dome shaped cover 19. A cylindrical receptacle forming a comparatively deep well 20 is mounted in the opening in the panel 18 and is intended to be used as a well for the heating and storing of a ham or the like, from which meat is to be sliced for the making of sandwiches. The well 20 (Fig. 4) is preferably formed with double walls, the inner wall 21 comprising the receptacle and the outer wall 22 a heat insulator and a support for an electrical heating element 23, whereby the receptacle 21 and the interior of the well 20 may be heated.

Supported on the inside of the receptacle 21 and arranged for elevating and lowering movement therein, is a platform 24, on which is adapted to rest the ham or the like, which is intended to be heated and stored. The ham is impailed on the sharp spikes 25, so that it cannot be dislodged from the platform 24, as the platform is being elevated and lowered in the well 20, and as slices are being taken from the ham, when the platform 24 carrying the ham is in elevated position. The platform 24 is provided with a spacer 26 which is secured thereto by machine screws 27, so that there is always clearance between the platform 24 and the bottom of the receptacle 21. The platform 24 is secured by means of an extension bracket 28 and machine screws 29, to an inverted U-shaped plate 30, which is adapted to slide in a guide member 31, the latter being secured by any suitable means to the cabinet wall. The plate 30 is provided with teeth 32 along one side which serve as a rack, which is adapted to engage a pinion 33, the latter being mounted on a shaft 34, which rotates in an opening formed in the guide block 31.

The shaft 34 has a square end 35 which engages a socket formed in the end of a shaft extension 36, which in turn has a square end 37 which extends through the wall of the cabinet 11, and is accessible from the outside of the cabinet, so that a hand crank may be employed if desired to rotate the shafts 34 and 36, and the pinion 33. The shafts 34 and 36 are also supported by a bracket 38, which is secured by any suitable means to the walls of the cabinet. The shaft 34 is held against axial movement by means of a set screw 39, which is arranged to engage a peripheral groove 40 formed in the shaft 34. The pinion 33, the shaft 34, and the extension 36 are driven by means of a sprocket 41 which is keyed to the shaft extension 36, which sprocket 41 is adapted to be driven by a chain 42 (Fig. 4) which is driven by a sprocket 43, which is secured to the shaft 44, which is in turn driven by a shaft 45 through a gear reduction 46. The shaft 45 is rotated by an electric motor 47 through the gears 48. The electric motor 47 is a reversible type motor, and is controlled by the switches 49 and 50, which are preferably mounted in a readily accessible place on the top plate 18. The motor circuit 51 is connected to a suitable source of 110 volt alternating current, as at 52. Upon the rotation of the motor 47 in one direction the platform 24 carrying the ham is raised to an elevated position in the well 20, so that the ham is readily accessible from above the well so that slices may be taken from the ham for making sandwiches.

When the motor 47 is reversed, the platform 24 carrying the ham is lowered into the well 20 where it may be stored in a properly heated condition.

Figure 5:
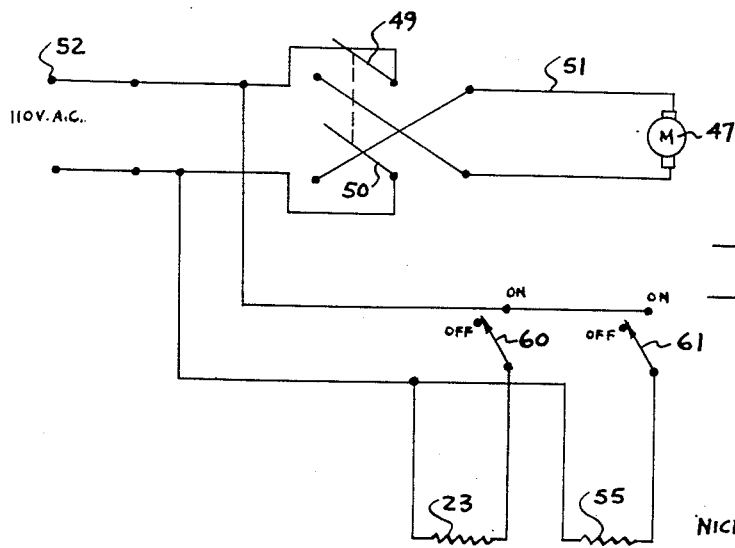
Fig. 5 is a diagrammatic sketch, showing the electrical wiring circuits employed in the device.

In addition to the well 20 for storing the ham, I also provide a rectangular well 53, which is preferably covered by a hinged cover 54 and which is also heated by means of a heating element 55, so that buns or the like may be stored therein to be used for sandwiches. The well 53 is also provided with double walls 56 and 57, the inner wall 57 being in the form of a removable receptacle, which is provided at the bottom with a steam generator 58, which generator 58 is provided with water, which when heated by the element 55 forms steam which rises through the openings 59 into the well 53, whereby the sandwich buns are kept moist. The heating elements 23 and 25 (Fig. 5) are also connected to the electric current source 52, and are controlled by individual switches 60 and 61.

It is believed that the operation of the device is obvious from the foregoing description.

Having described my invention, what I claim and desire to secure by Letters Patent is:

In a device of the character described in combination, a cabinet having a pair of comparatively deep wells for storing food, electrical heating elements for said wells, an electric circuit for said elements, a vertically moveable spiked platform in one of said wells, means for vertically moving and supporting said platform, said means comprising a guide block, a plate slidable in said block, a rack on said plate, and a pinion for moving said plate, said pinion being keyed to a shaft rotatable in said block, a shaft extension having a socket engageable with one end of said shaft, the other end of said shaft extension terminating at a point on the exterior of said cabinet, a sprocket keyed to said shaft extension, an electric motor for driving said sprocket, said motor being connected to said first-named electric circuit, and means in said circuit for independently controlling said motor and said heating elements.

References Cited in the file of this patent

UNITED STATES PATENTS

| Number | Name | Date |
|---|---|---|
| 361,742 | Bennett | Apr. 26, 1887 |
| 1,825,406 | Lipham | Sept. 29, 1931 |
| 2,036,826 | Peters | Apr. 7, 1936 |
| 2,191,275 | Fink | Feb. 20, 1940 |
| 2,213,483 | Benson | Sept. 3, 1940 |
| 2,372,978 | Pelenberg | Apr. 3, 1945 |
| 2,386,815 | Rubenstein | Oct. 16, 1945 |
| 2,395,486 | Jones | Feb. 26, 1946 |
| 2,416,645 | Rutenber | Feb. 25, 1947 |
| 2,442,557 | Cox | June 1, 1948 |
| 2,559,444 | Locke | July 3, 1951 |

FOREIGN PATENTS

| Number | Country | Date |
|---|---|---|
| 143,739 | Germany | Aug. 31, 1903 |
| 412,970 | France | May 14, 1910 |